United States Patent [19]

Moore et al.

[11] 4,321,610

[45] Mar. 23, 1982

[54] DOT MATRIX PRINTER WITH HALF SPACE DOT CAPABILITY

[75] Inventors: Donn F. Moore, Utica; Michael A. Folkerts, Rochester, both of Mich.

[73] Assignee: Computer Peripherals, Inc., Minneapolis, Minn.

[21] Appl. No.: 146,881

[22] Filed: May 5, 1980

[51] Int. Cl.$^3$ .............................................. G01D 15/14

[52] U.S. Cl. ................................... 346/108; 346/76 L

[58] Field of Search .................... 346/108, 109, 110 R, 346/110 V, 75, 76 L; 340/716, 728

[56] References Cited

U.S. PATENT DOCUMENTS 4,050,077 9/1977 Yamada et al. ........................ 346/75
4,052,719 10/1977 Hutt et al. ........................ 340/728 X
4,115,787 9/1978 Fujimoto et al. ..................... 346/75
4,115,788 9/1978 Takano et al. ........................ 346/75

*Primary Examiner*—L. T. Hix
*Assistant Examiner*—W. J. Brady
*Attorney, Agent, or Firm*—Robert M. Angus; Joseph A. Genovese

[57] ABSTRACT

A method and apparatus is provided for enhancing the quality of characters printed on a media by a dot matrix printer, and particularly for enhancing edges of characters disposed at an angle to the rows of the matrix. First and second memory matrices contain the information as to the relative position along each row for printing dots to form each character; the first memory containing information to form a basic pattern and the second memory containing information related to an enhancement pattern which, if printed at the same carrier frequency as the basic pattern but phase shifted therefrom by a predetermined relationship (for example, 180°), will enhance those edges of the character being printed disposed at an angle, other than 90°, from the rows of dots being printed. The information in the first and second memories are sequenced through first and second shift registers, one of which is sequenced by a clock signal and the other is sequenced by an inverted clock signal. Thus, the shift registers are driven at the same carrier frequency, but at some phase relation (for example, 180°) from each other. The sequenced information from the first and second shift registers are combined to drive a laser gun for the dot matrix printer to print the enhanced character.

2 Claims, 4 Drawing Figures

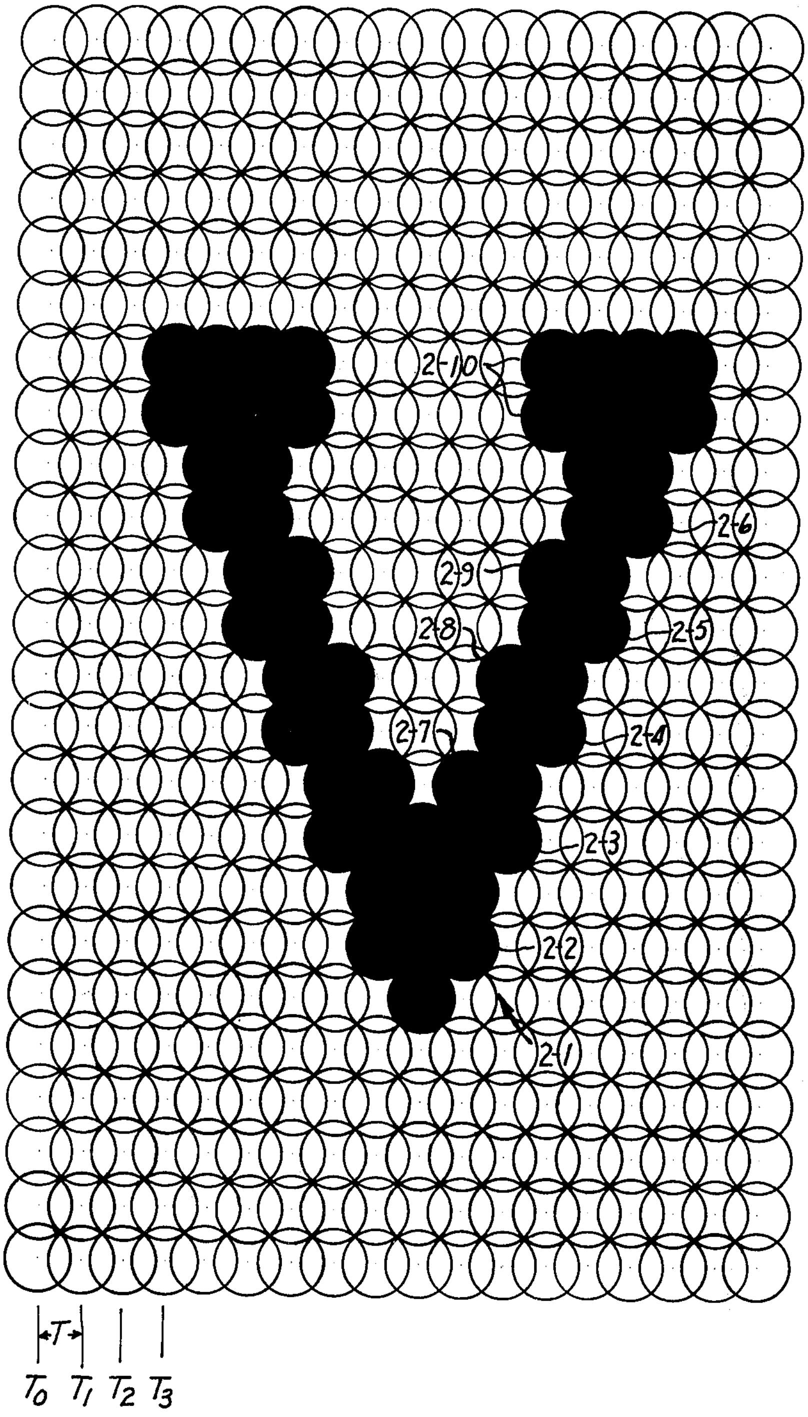
FIG. 2 - BASIC CHARACTER PATTERN

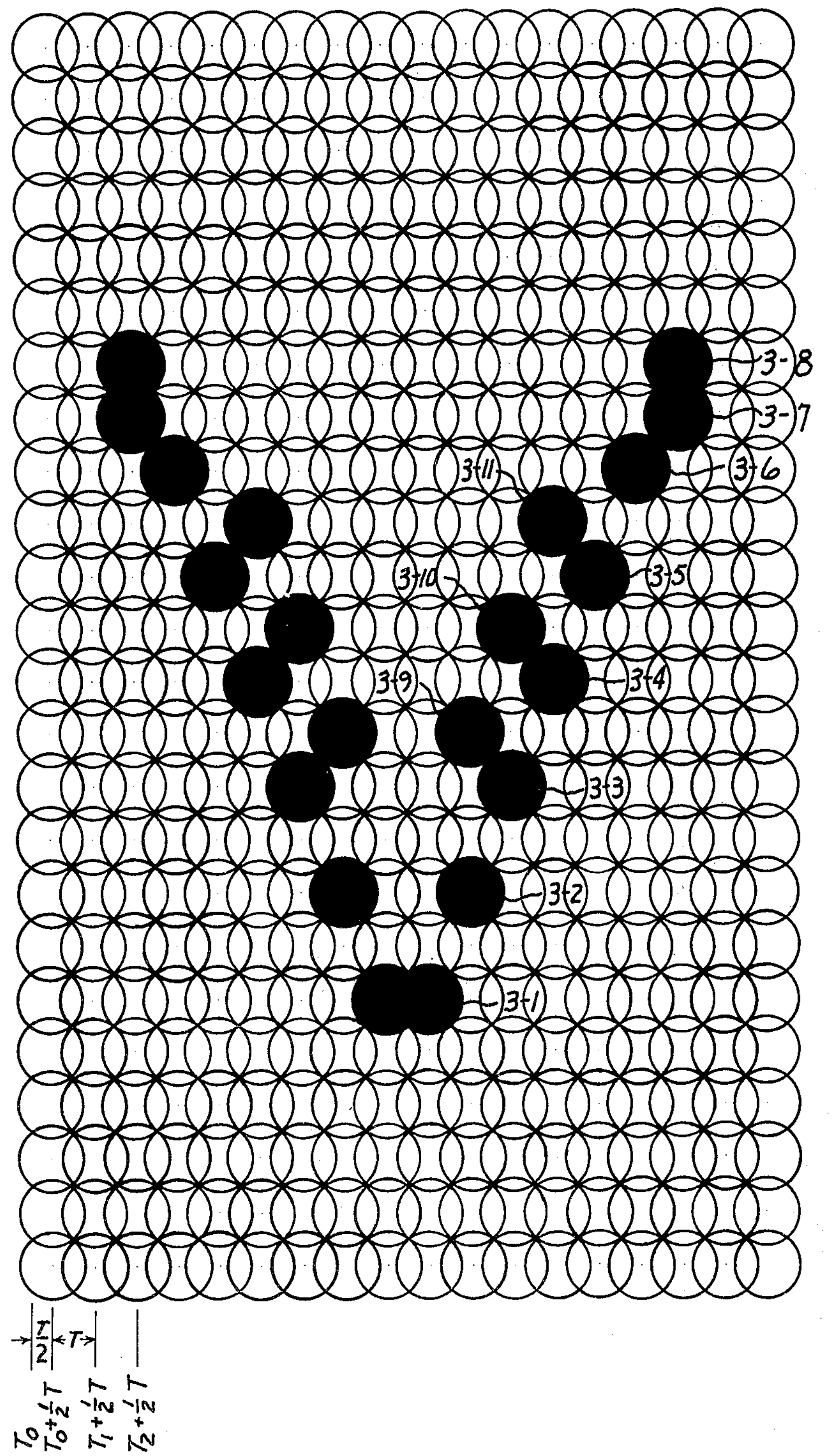
FIG. 3 - HALF-DOT CHARACTER PATTERN

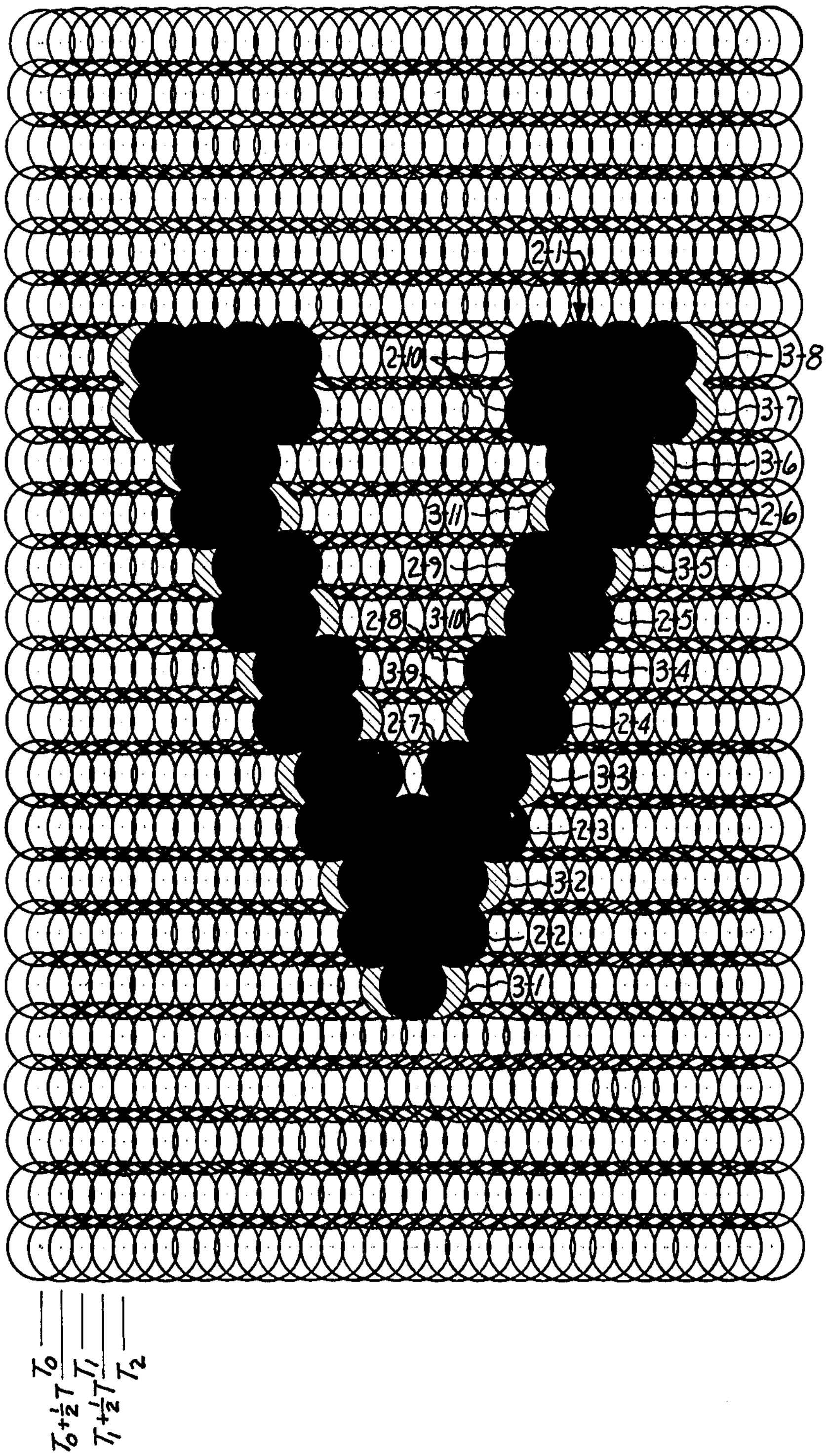
FIG. 4 ENHANCED CHARACTER PATTERN

DOT MATRIX PRINTER WITH HALF SPACE DOT CAPABILITY

This invention relates to non-impact printing, and particularly to enhancement of angular lines printed by laser dot matrix techniques.

Non-impact dot matrix printers print characters utilize a dot matrix, a common aspect ratio of which is of the order of 0.1×0.166. Typically, characters are printed at the rate of 10 characters per inch, with each character formed by a matrix of 18×24 (18 dots along the horizontal, 24 dots vertically). Typically, the dot matrix is printed by modulating a laser beam directed at a recording media in such a way as to place small spots of light on the recording surface. The spots are then developed and transferred to paper utilizing standard xerographic techniques. For printing 10 characters per inch utilizing an 18×24 matrix, resolution in the horizontal direction (rows) is limited to less than 1/180 inch (0.0056 inches). Since the position of the dots making up the character is fixed, the design of the character is limited by the spacing between dot centers along a row as viewed from left to right, and the degree of dot overlap. Since the position of the rows of dots is fixed, the design of characters to be printed can be controlled only by adjusting the dot spacing or adjusting the degree of dot overlap. However, if the degree of dot overlap is increased to any great extent, blurring of the image of the character may result. Decreasing the dot spacing to enhance the character image adds to the quantity of dots in each horizontal row and to the quality of the image, but the carrier frequency of the laser modulation must be increased or the speed of the printer decreased. It can therefore be seen that although straight lines may be achieved in the horizontal and vertical directions, it is impossible to achieve an absolutely straight angular line. Consequently, the quality of printing of angular lines has not been altogether good utilizing dot laser printing techniques. This is occasioned because of the trade-off necessary between the carrier frequency and overall speed of the printer, on one hand, and the desirability for good quality angular lines, on the other.

The present invention concerns a technique for enhancing the quality of character patterns in dot laser printers without sacrificing the carrier frequency of the laser modulating signal or the speed of the printer. In particular, the present invention provides apparatus and techniques for enhancing angular lines in characters printed by dot laser printers.

In particular, the present invention concerns the addition of an additional character memory matrix and shift register to operate the laser utilized in the dot printing. The additional character memory matrix contains character data concerning the placement of dots for enhancement of angular lines in the character and provides that data to the shift register which is operated at the same carrier frequency as the shift register for the basic character memory matrix. However, the shift register containing the enhancement data is operated 180° out of phase as the other shift register.

It is, accordingly, an object of the present invention to provide apparatus for enhancing character images printed by dot techniques.

It is another object of the present invention to provide apparatus for half-dot printing of characters for enhancement of angular lines in characters printed by dot techniques.

It is yet another object to the present invention to provide in a dot laser printer, a half-dot character memory matrix to provide half-dot data to a shift register for operation of the laser, the shift register associated with the half-dot character memory matrix being operated at a half-cycle phase shift from the operation of the shift register associated with the basic character memory matrix.

In accordance with the present invention, a basic character memory matrix contains basic character data for the various characters to be printed by the printer. A half-dot character memory matrix contains information for enhancement of angular lines of characters to be printed by the printer. Both character memory matrices are addressed by a character address to provide basic character data to a first shift register and half-dot character data to a second shift register. The horizontal dot clock drives the first shift register at the frequency of the carrier to thereby print a basic character pattern. An inverter is provided to invert the horizontal dot clock signal which in turn is supplied to the second shift register to thereby simultaneously operate the laser at the carrier frequency of the printer but shifted by one-half cycle.

One feature of the present invention resides in the fact that angular lines may be enhanced utilizing the data contained in the half-dot character memory matrix as operated through the second shift register.

The above and other features of this invention will be more fully understood from the following description and the accompanying drawings in which:

FIG. 2 is a representation of a basic character pattern as might be printed by prior printers and as accomplished by part of the apparatus illustrated in FIG. 1;

FIG. 3 is an illustration of the half-dot character pattern as accomplished by part of the apparatus illustrated in FIG. 1 and which is printed simultaneously with the basic character pattern illustrated in FIG. 2; and FIG. 4 illustrates a character printed utilizing both the basic character pattern and the half-dot character pattern.

Figure 1:
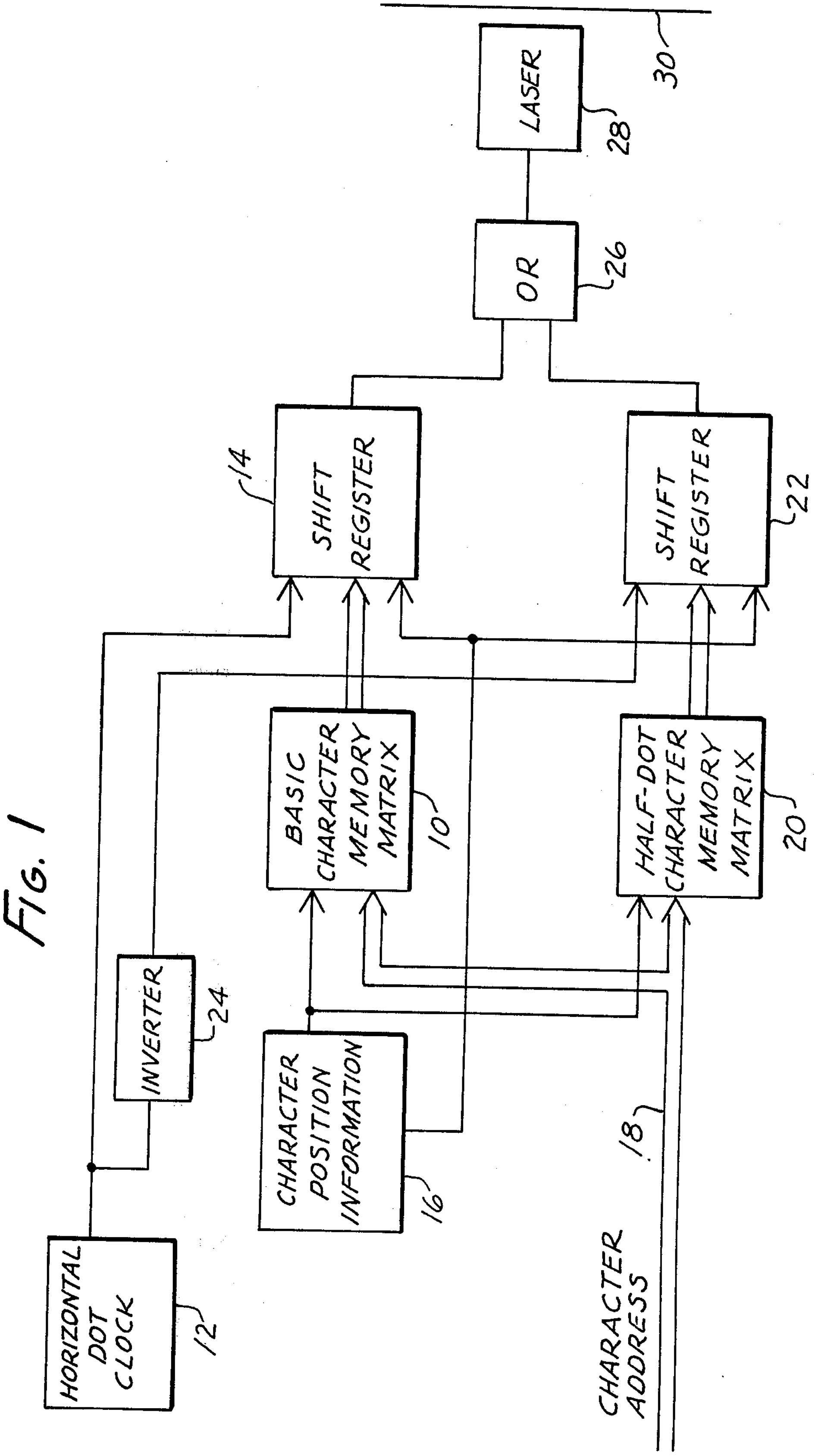
FIG. 1 is a block circuit diagram of the apparatus for accomplishing half-dot printing in accordance with the presently preferred embodiment of the present invention.

With reference to the drawings particularly to FIG. 1, there is illustrated a basic character memory matrix 10 which contains a complete set of character matrices for basic character patterns of characters to be printed by the printer. A horizontal dot clock 12 provides a shift input to shift register 14 which in turn receives an entire horizontal row of information to be printed. Horizontal dot clock 12 provides a clock signal at a frequency corresponding to the correct carrier frequency of the matrix printer. Character position information is provided to the basic memory matrix 10 and to shift register 14 to select the correct dot row to be accessed from the basic character matrix and to control the horizontal position of the individual character to be printed. Character address is supplied via bus 18 to the basic character memory matrix 10. In operation of the apparatus thus far described, the character address is supplied to basic character memory matrix 10 to select a character to be printed.

The laser 28 scans across th entire width of the recording media 30, recording one row of dots for all characters to be printed. Thus, the data for the first row of dots for the first character is loaded into shift register 14, followed by the data for the first row of dots for the second character, and so on until the first row of dots is printed for the entire line of characters across the page. At that point, the recording media is shifted by the spacing between rows of dots (i.e., 0.0056 inches vertically), and the process continues for the second row of dots. The process continues until all 24 rows of dots for all characters in the line, whereby the recording media is advanced in preparation for the next line to be printed. As will be evident to those skilled in the art, shift register 14 is preferably a dual shift register holding data and supplying modulating signals for a row of dots for one character while being loaded with data for the next character. As the laser moves across the recording media associated with the printer, horizontal dot clock 12 supplies signals to the shift register to continuously shift registers 14 to operate the laser. As a result, a basic character pattern such as illustrated in FIG. 2, will be achieved. As shown in FIG. 2, the dot size is preferrably large enough so that dots printed at consecutive dot locations overlap with each other, and dots in adjacent rows will also overlap.

The present invention concerns the addition of half-dot character memory matrix 20 containing information relating to the enhancement or half-dot character pattern to be printed for enhancement of angular lines. Half-dot character memory matrix 20 is addressed via character address 14 and provides half-dot character pattern information to shift register 22. Like shift register 14, shift register 22 is preferably a dual shift register for holding data relating to a row of dots for two characters. Character position information 16 provides outputs to half-dot character memory matrix 20 and shift register 22 for control of the character position. Inverter 24 receives an input from horizontal dot clock 12 to provide an inverted clock signal to shift registers 22. Hence, it can be appreciated that shift register 22 operates at the same frequency as shift register 14, but is phase shifted by one-half cycle of the horizontal dot clock signal therefrom. The outputs of shift registers 14 and 22 are provided to OR gate 26 to operate the laser.

With reference particularly to FIGS. 2 and 3, the formation of the letter "V" will be explained. As heretofore described, the basic character pattern stored in basic character memory matrix 10 is shifted to shift register 14 so that upon operation of clock 12 the basic character pattern illustrated in FIG. 2 will be printed. Each of the circles in FIG. 2 represent a single dot of the dot pattern, those dots being exposed to form the letter "V" being shaded. As shown in FIG. 2, each column of dots is shifted from the previous one by a period time T, commencing with To. Thus, time T represents the cycle or the frequency of the horizontal dot clock signal from clock 12. As shown in FIG. 2, the column of dots at T3 commences operation of certain lasers to commence printing of the letter "V," starting with the upper left-hand portion of the letter.

The half-dot character pattern is stored in half-dot character memory matrix 20 and transferred to shift register 22. In the case of the letter "V," the pattern is illustrated in FIG. 3. As shown in FIG. 3 the circles again represent the locations of the dots to be printed, the shaded dots being those which are printed to enhance the letter "V." However, since shift register 22 is operated at a half-cycle from shift register 14, the centers of each dot are phase shifted by one-half cycle T from the centers of the dots illustrated in FIG. 1. Hence, the first row of dots is positioned at T0+$\frac{1}{2}$ T, whereas the second row of dots is positioned at T1+ $\frac{1}{2}$ T, and so on. As shown in FIG. 3 the first column of dots having character information will appear at T2+$\frac{1}{2}$ T and will form part of the upper left-hand portion of the letter "V."

With reference to FIG. 4, an enhanced character is illustrated for the letter "V." In this case, the half-dot pattern shown by dots 3-1 through 3-11 in FIG. 3 are illustrated as enhancing the dot pattern for the letter "V" in corresponding locations. The basic character pattern 2-1 illustrated in FIG. 2 is superimposed on the half-dot character pattern, the basic character pattern providing parts of the angular line shown at dots 2-2 through 2-10, respectively.

The present invention thus provides apparatus for half-dot character printing which does not deter from the speed of the printer nor requires increasing the frequency of dot generation. Instead, the apparatus merely requires an additional character memory matrix to contain half-dot character information together with a shift register to store data for each row of dots to be printed. Character design is accomplished by utilizing both memory matrices and shift registers to modulate the laser devide to provide basic dot character patterns and half-dot character enhancement patterns in a single pass over the recording media to create the enhanced character pattern illustrated in FIG. 4. If for some reason it is desirable to not enhance a particular character, the half-dot character memory matrix either is not loaded with information or is not accessed by the character address on bus 18.

The present invention provides an effective method and apparatus for half-dot character enhancement and is effective in operation. This invention is not to be limited by the embodiment shown in the drawings and described in the description, which is given by way of example and not of limitation, but only in accordance with the scope of the appended claims.

What is claimed is:

1. Apparatus for printing characters by selectively printing a plurality of dots in pre-selected positions along each of a plurality of rows comprising:

first memory matrix means for storing first data related to the characters to be printed, such first data comprising, for each character, information concerning the location of each dot to be printed at each pre-selected first position along each of said rows in a first matrix to form a basic pattern for the respective character;

first shift register means for storing all information of the first data related to a row of dots for at least one character;

second memory matrix means for storing second data related to the characters to be printed, such second data comprising, for each character, information concerning the location of each dot to be printed at each pre-selected second position along each of said rows in a second matrix to form an enhancement pattern for the respective character, the arrangement of said enhancement pattern being such as to provide dots along said rows at pre-selected second positions between pre-selected first positions of said basic pattern along the edges of the respective characters which are skewed from said rows at an angle other than 90° when said second matrix is superimposed over said first matrix in an offset position along said rows by an amount less than the distance between adjacent dots of said basic pattern along said rows;

second shift register means for storing all information of said second data related to at least said row of dots for said one character;

clock means for supplying a first clock signal to said first shift register means for continuously sequencing the information of the first data stored therein to sequentially provide a first information signal to a first output at a predetermined carrier frequency;

inverter means connected to said clock means for supplying a second clock signal to said second shift register means for continuously sequencing the information of second data stored therein to sequentially provide a second information signal to a second output at said predetermined carrier frequency, said second clock signal being shifted from said first clock signal by one-half clock cycle; and means for combining said first and second information signals and for supplying the combined information signals to a print means.

2. Apparatus according to claim 1 wherein said first and second shift register means contain information related to one row of dots for a plurality of characters and said first and second memory matrix means continually sequence data related in a line to be printed, and means for operating said first and second shift register means and said first and second memory matrix means for shifting to a second row of data for all characters in said line.

* * * * *